United States Patent
Orzel et al.

(10) Patent No.: US 6,564,543 B1
(45) Date of Patent: May 20, 2003

(54) SYSTEM AND METHOD FOR MONITORING A CONDITIONING CATALYST

(75) Inventors: Daniel V. Orzel, Westland, MI (US); Michael James Uhrich, Sylvan Lake, MI (US); Theodore Michael Kostek, Lafayette, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 09/828,020

(22) Filed: Apr. 7, 2001

(51) Int. Cl.[7] ................................................ F01N 3/00
(52) U.S. Cl. ............................ 60/277; 60/274; 60/285; 73/118.1
(58) Field of Search ........................... 73/118.1; 60/276, 60/277, 285, 274

(56) References Cited

U.S. PATENT DOCUMENTS

| | | | |
|---|---|---|---|
| 5,157,921 A | * 10/1992 | Ito et al. ................ | 73/118.1 |
| 5,255,515 A | 10/1993 | Blumenstock et al. | |
| 5,319,921 A | * 6/1994 | Gopp ....................... | 60/274 |
| 5,341,642 A | 8/1994 | Kurihara et al. | |
| 5,400,592 A | 3/1995 | Mukaihira et al. | |
| 5,732,553 A | * 3/1998 | Mitsutani ............... | 60/277 |
| 5,758,491 A | 6/1998 | Agustin et al. | |
| 5,765,369 A | 6/1998 | Tanaka et al. | |
| RE35,887 E | 9/1998 | Ishii et al. | |
| 5,819,530 A | 10/1998 | Asano et al. | |
| 5,887,421 A | * 3/1999 | Mitsutani ............... | 60/274 |
| 6,003,309 A | 12/1999 | Agustin et al. | |

* cited by examiner

Primary Examiner—Thomas Denion
Assistant Examiner—Diem Tran
(74) Attorney, Agent, or Firm—Allan J. Lippa; John D. Russell

(57) ABSTRACT

A system and method for monitoring a conditioning catalyst positioned upstream of an oxygen sensor used for feedback control of an internal combustion engine include comparing shapes of an upstream oxygen sensor signal and of the signal from the oxygen sensor used for feedback control of the engine while ignoring the signal amplitudes and mean values. Operational efficiency of the conditioning catalyst is determined based on a measure of the relative similarity or difference between the two signals.

15 Claims, 4 Drawing Sheets

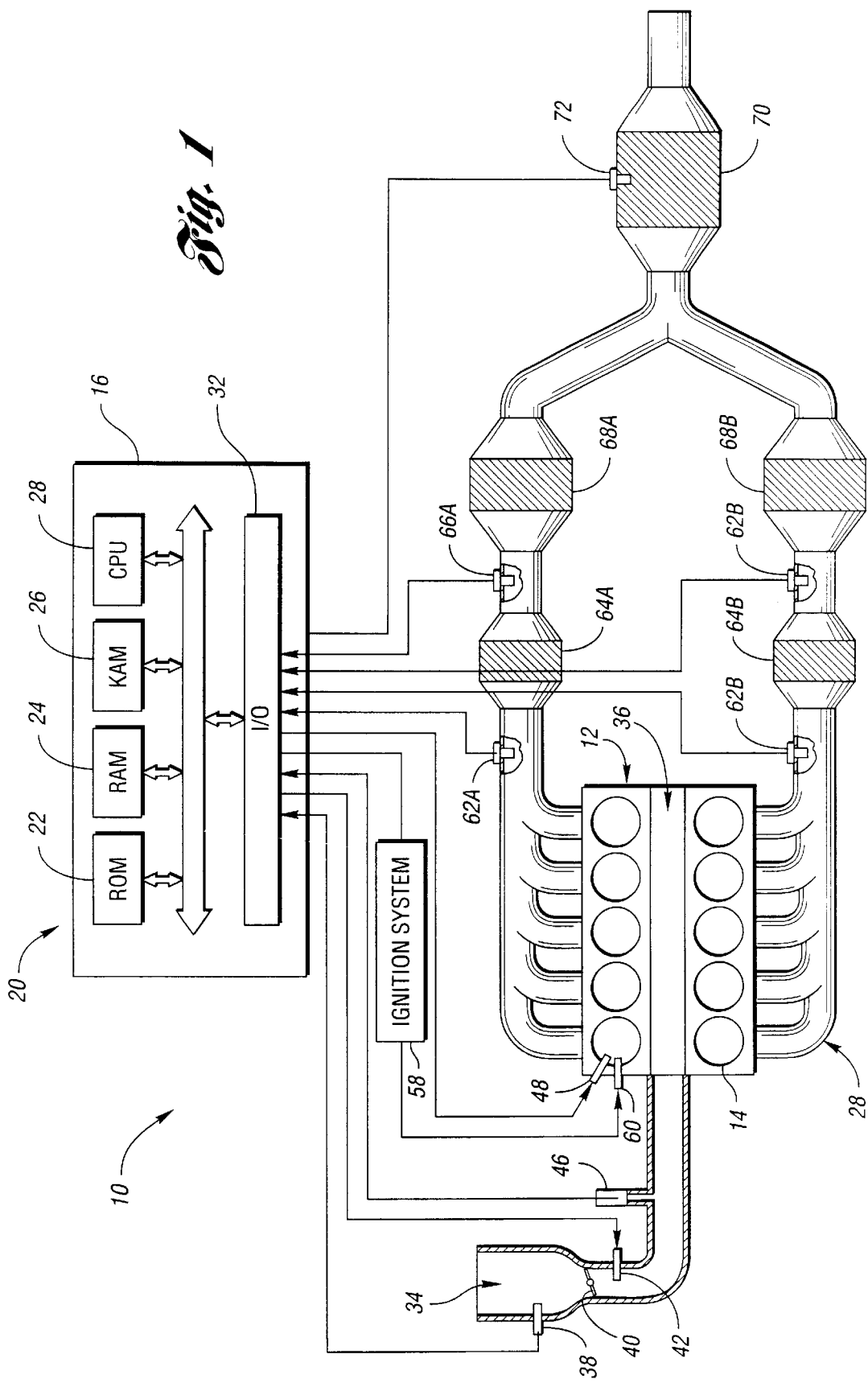

SYSTEM AND METHOD FOR MONITORING A CONDITIONING CATALYST

BACKGROUND OF THE INVENTION

1. Field of the Invention

The present invention relates to a system and method for monitoring a conditioning catalyst for an internal combustion engine.

2. Background Art

A conditioning catalyst is a small catalytic converter positioned upstream of the oxygen sensor used for air/fuel ratio feedback control during closed loop control of an internal combustion engine. The conditioning catalyst acts as a mechanical/chemical filter of the exhaust gas. Placement upstream of the control oxygen sensor protects the sensor from contaminants while straightening the flow of exhaust gases and promoting equilibration of the engine exhaust. These features allow the main catalyst system to be used more effectively to reduce tailpipe emissions toward zero.

Because of the small size and unique formulation of the conditioning catalyst, conventional monitoring strategies may not be acceptable for various applications which require accurate monitoring to detect any reduction of conversion efficiency of the conditioning catalyst which may significantly impact the overall performance of the entire catalyst system.

SUMMARY OF THE INVENTION

An object of the present invention is to provide a system and method for monitoring a conditioning catalyst placed upstream of an exhaust gas oxygen sensor used for air/fuel ratio control.

In carrying out the above object and other objects, advantages, and features of the invention, a system and method is provided for monitoring a conditioning catalyst positioned upstream of a control exhaust gas oxygen sensor. The system and method utilize the control exhaust gas oxygen sensor for feedback control of an internal combustion engine. The system and method further utilize the control exhaust gas oxygen sensor and a monitoring exhaust gas sensor positioned upstream of the conditioning catalyst to monitor the conditioning catalyst. The method includes sampling signals generated by the control exhaust gas oxygen sensor and the monitoring exhaust gas oxygen sensor, adjusting signal samples to reduce the effect of any difference in signal amplitudes and mean values on a subsequent comparison of the signals, and comparing shapes of the signals based on the adjusted signal samples to determine operational efficiency of the conditioning catalyst.

In one embodiment according to the present invention, a system or method for monitoring a conditioning catalyst include storing signal samples from a monitoring exhaust gas oxygen sensor positioned upstream of the conditioning catalyst, and storing signal samples from a control exhaust gas oxygen sensor used for feedback control of the internal combustion engine, the control sensor being positioned downstream of the conditioning catalyst. This embodiment may include determining mean values for the monitoring exhaust gas oxygen sensor and the control exhaust as oxygen sensor, determining zero mean version of the monitoring sensor signal and the control sensor signal, summing products of corresponding values for the zero mean versions of the monitoring sensor signal and the control sensor signal, determining a product of a sum of squares of the zero mean version values of the monitoring sensor signal and a sum of squares of the zero mean version values of the control sensor signal, and calculating a ratio based on the steps of summing products and determining a product as an indication of conversion efficiency of the conditioning catalyst.

The present invention provides a number of advantages. For example, the present invention provides an efficient algorithm amenable for use in a conventional engine/vehicle controller for monitoring a conditioning catalyst based on comparison of signal shapes for a monitoring sensor and a feedback control sensor. Proper functioning of the conditioning catalyst allows the main catalyst system to be used more effectively to reduce tailpipe emissions. Accurate monitoring of the conditioning catalyst may extend its useful life and reduce premature warranty claims while promptly notifying the vehicle operator of any actual degradation in performance to comply with applicable regulations.

The above advantage and other advantages, objects, and features of the present invention will be readily apparent from the following detailed description of the preferred embodiments when taken in connection with the accompanying drawings.

BRIEF DESCRIPTION OF THE DRAWINGS

FIG. 1 is a block diagram illustrating operation of a system or method for monitoring a conditioning catalyst according to one embodiment of the present invention;

DETAILED DESCRIPTION OF THE PREFERRED EMBODIMENT(S)

Figure 2A:
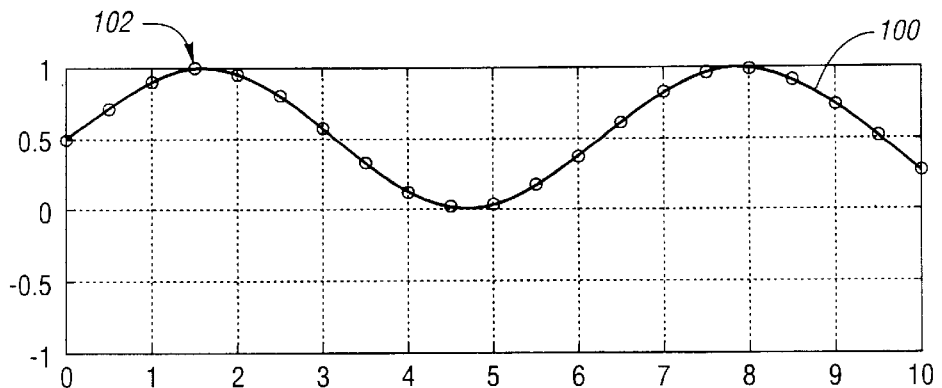
FIGS. 2a and 2b illustrate a signal and corresponding zero mean version of the signal, respectively, for use in monitoring a conditioning catalyst according to one embodiment of the present invention.

A block diagram illustrating an engine control system for a representative internal combustion engine with conditioning catalyst monitor according to one embodiment of the present invention is shown in FIG. 1. System 10 preferably includes an internal combustion engine 12 having a plurality of cylinders, represented by cylinder 14. In one preferred embodiment, engine 12 includes eight cylinders arranged in a "V" configuration having two cylinder banks with four cylinders each.

As one of ordinary skill in the art will appreciate, system 10 includes various sensors and actuators to effect control of the engine. One or more sensors or actuators may be provided for each cylinder 14, or a single sensor or actuator may be provided for the engine. For example, each cylinder 14 may include four actuators which operate corresponding intake and exhaust valves, while only including a single engine coolant temperature sensor.

System 10 preferably includes a controller 16 having a microprocessor 28 in communication with various computer-readable storage media, indicated generally by reference numeral 20. The computer readable storage media preferably include a read-only memory (ROM) 22, a random-access memory (RAM) 24, and a keep-alive memory (KAM) 26. As known by those of ordinary skill in the art, KAM 26 is used to store various operating variables while controller 16 is powered down but is connected to the vehicle battery. Computer-readable storage media 20 may be implemented using any of a number of known memory devices such as PROMs, EPROMs, EEPROMs, flash memory, or any other electric, magnetic, optical, or combination memory device capable of storing data, some of which represents executable instructions, used by microprocessor 28 in controlling the engine. Microprocessor 28 communicates with the various sensors and actuators via an input/output (I/O) interface 32. Of course, the present invention could utilize more than one physical controller, such as controller 16, to provide engine/vehicle control depending upon the particular application.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 16 indicative of the mass airflow. If no mass airflow sensor is present, a mass airflow value may be inferred from various engine operating parameters. A throttle valve 40 may be used to modulate the airflow through intake 34 during certain operating modes. Throttle valve 40 is preferably electronically controlled by an appropriate actuator 42 based on a corresponding throttle position signal generated by controller 16. A throttle position sensor provides a feedback signal (TP) indicative of the actual position of throttle valve 40 to controller 16 to implement closed loop control of throttle valve 40.

As illustrated in FIG. 1, a manifold absolute pressure sensor 46 may be used to provide a signal (MAP) indicative of the manifold pressure to controller 16. Air passing through intake 34 enters the combustion chambers or cylinders 14 through appropriate control of one or more intake valves. The intake and exhaust valves may be controlled directly or indirectly by controller 16 along with ignition timing (spark) and fuel to selectively activate/deactivate one or more cylinders 12 to provide variable displacement operation. A fuel injector 48 injects an appropriate quantity of fuel in one or more injection events for the current operating mode based on a signal (FPW) generated by controller 16 processed by an appropriate driver. Control of the fuel injection events is generally based on the position of the pistons within respective cylinders 14. Position information is acquired by an appropriate crankshaft sensor which provides a position signal (PIP) indicative of crankshaft rotational position. At the appropriate time during the combustion cycle, controller 16 generates a spark signal (SA) which is processed by ignition system 58 to control spark plug 60 and initiate combustion within an associated cylinder 14.

Controller 16 (or a camshaft arrangement) controls one or more exhaust valves to exhaust the combusted air/fuel mixture of activated or running cylinders through an associated exhaust manifold, indicated generally by reference numeral 28. Depending upon the particular engine configuration, one or more exhaust manifolds may be used. In one preferred embodiment, engine 12 includes an exhaust manifold 28 associated with each bank of cylinders as illustrated in FIG. 1.

Monitoring sensors 62A and 62B are preferably associated with a bank of cylinders and provide a signal (EGO) indicative of the oxygen content of the exhaust gases to controller 16. Monitoring sensors 62A and 62B are preferably exhaust gas oxygen sensors. The present invention is independent of the particular type of exhaust gas oxygen sensor utilized, which may depend on the particular application. In one embodiment, heated exhaust gas oxygen sensors (HEGO) are used for monitoring and feedback control as described below. Of course, various other types of air/fuel ratio sensors/indicators may be used such as a universal exhaust gas oxygen sensor (UEGO), for example.

The exhaust gas passes through the exhaust manifolds 28 and through associated conditioning catalysts 64A and 64B which act as mechanical and chemical filters by straightening the exhaust gas flow and acting as catalysts for conversion of a portion of the exhaust gases. Conditioning catalysts 64A and 64B are positioned upstream relative to control exhaust gas oxygen sensors 66A and 66B, respectively. Control sensors 66A and 66B may be used during closed loop control of the air/fuel ratio during certain modes of engine operation. The filtering provided by conditioning catalysts 64A and 64B reduces the contaminants contacting control sensors 66A and 66B.

According to one embodiment of the present invention, signals from monitoring sensor 62A and control sensor 66A are sampled at a predetermined interval and adjusted to reduce the effect of any difference in signal amplitudes and mean values on a subsequent comparison of the signals. The adjusted signals are then compared to determine operational efficiency of the conditioning catalyst based on the relative similarity or differences between the signal shapes. As the conversion efficiency of conditioning catalyst 64A decreases, the adjusted signal shapes become similar provided the time delay between sensors is considered. The relative similarity or difference between signal shapes may be determined using a correlation coefficient, for example, as illustrated and described below.

After passing through conditioning catalysts 64A and 66B, exhaust gases flow through an associated close-coupled catalyst 68A, 68b, respectively, and are combined prior to flowing through a main underbody catalyst 70.

A temperature sensor 72 may be provided to monitor the temperature of a catalyst within emission control device or underbody catalyst 70, depending upon the particular application. Alternatively, the temperature may be estimated using an appropriate temperature model based on various other sensed engine/vehicle parameters which may include mass airflow, manifold absolute pressure or load, engine speed, air temperature, engine coolant temperature, and/or engine oil temperature, for example. A representative temperature model could be developed to determine catalyst temperature for any one of the emission control devices 64A, 64B, 68A, 68B and/or 70 using various sensed and estimated engine operating parameters as described in U.S. Pat. No. 5,956,941, for example.

According to the present invention, controller 16 monitors operation of conditioning catalysts 64A, 64B by comparing the signals of respective monitoring and control exhaust gas oxygen sensors. The signal shapes are compared while ignoring amplitude and mean value variations by first determining a modified or adjusted zero mean version of the signal. A correlation coefficient may be calculated using the zero mean versions to determine the relative similarity or differences between the signals. The correlation coefficient is compared to a threshold to determine whether the conditioning catalyst is functioning as desired.

Figure 2B:
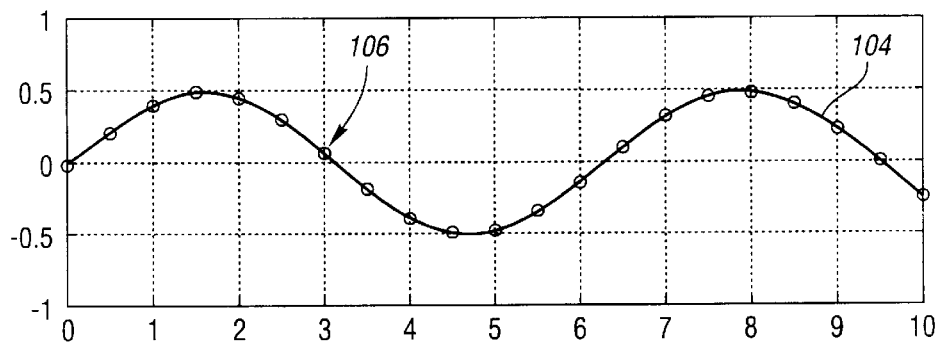

FIGS. 2a and 2b illustrate a signal and corresponding zero mean version of the signal, respectively, for use in monitoring a conditioning catalyst according to one embodiment of the present invention. Signal wave form 100 represents a signal generated by a sensor, such as an exhaust gas oxygen sensor, for example. Signal 100 is periodically sampled with samples represented generally by reference numeral 102. Signal waveform 100 and corresponding samples 102 vary between about zero and unity with a mean value of about 0.5. Waveform 104 represented by corresponding samples 106 is the zero mean version of waveform 100 and corresponding samples 102. The zero mean version is determined by subtracting the mean value from each of the samples 106. As illustrated in FIG. 2b, waveform 104 varies between about −0.5 and +0.5 with a mean value of about zero.

The mean value of a particular sensor signal may be determined by a variety of methods depending upon the particular application. For example, the mean or average value of each signal may be computed or calculated in real-time by summing the samples and dividing by the number of samples. However, this approach may require significant data storage and increased processing. Another alternative is to use a low pass filter to provide an estimate of the mean value of the signal. Having a real-time estimate of the mean value reduces data storage since each sample is immediately processed as it is acquired. The mean value may also be predetermined off-line using empirical data. The empirical data may be used to generate a fixed value for each sensor. Alternatively, empirical data may be used to populate a lookup table which is accessed or indexed by an engine operating or control parameter such as air/fuel ratio, engine speed, load, hours of operation, or the like.

Figure 3A:
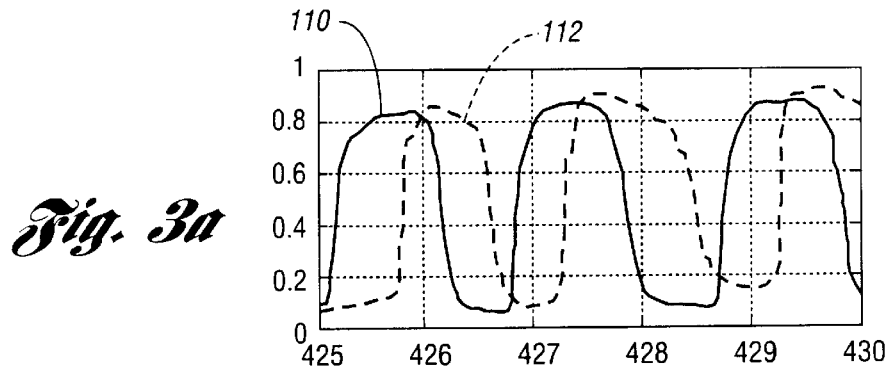
FIGS. 3a and 3b illustrate oxygen sensor signals having similar shapes indicating a degraded conditioning catalyst and differing shapes indicating an acceptable catalyst, respectively.

FIG. 3a illustrates representative oxygen sensor signals for a monitoring sensor and a control sensor positioned upstream and downstream, respectively, relative to a conditioning catalyst according to one embodiment of the present invention. Signal 110 corresponds to a monitoring exhaust gas oxygen sensor positioned upstream relative to a conditioning catalyst. Signal 112 represents a signal produced by the exhaust gas oxygen sensor used for feedback control of the internal combustion engine. Signals 110 and 112 have similar shapes but are time shifted by the transit time of the exhaust gasses flowing past the upstream and downstream sensors. As illustrated in FIG. 3a, signals 110 and 112 have a similar shape which indicates degraded performance of the conditioning catalyst. A newer conditioning catalyst has greater oxygen storage such that the downstream control sensor experiences a different oxygen concentration than the upstream monitoring sensor. The difference is represented in the sensor signals as illustrated in FIG. 3b.

Figure 3B:
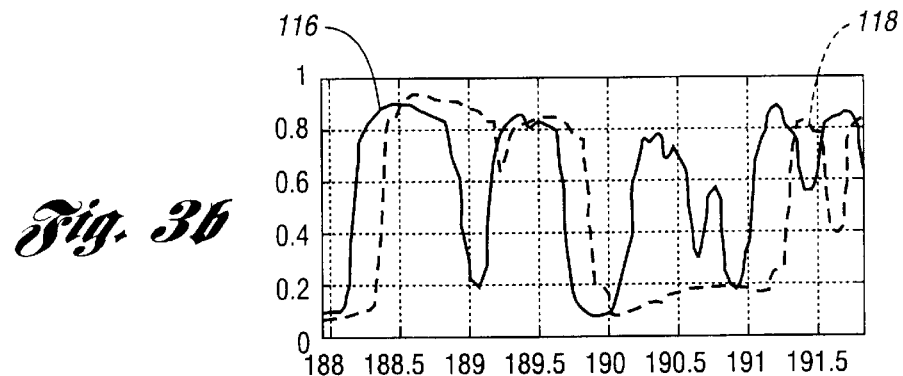

Signal 116 of FIG. 3b represents an upstream exhaust gas oxygen sensor signal used for monitoring the conditioning catalyst. Signal 118 represents the downstream exhaust gas oxygen sensor signal corresponding to the sensor used for feedback control of the internal combustion engine. The oxygen storage provided by the conditioning catalyst results in a significantly different exhaust gas oxygen sensor signal 118 relative to the pre-catalyst sensor signal 116. As such, comparison of the signal shapes while ignoring the amplitude and mean values results in significant differences which indicates a properly functioning conditioning catalyst.

According to the present invention, signals generated by the control exhaust gas oxygen sensor and the monitoring exhaust gas oxygen sensor positioned upstream relative to the control exhaust gas oxygen sensor are periodically sampled. The signal samples are adjusted to reduce the effect of any difference in signal amplitudes and mean values on a subsequent comparison of the signals. The signal shapes are compared using the adjusted signal samples to determine operational efficiency of the conditioning catalyst. As described above, signals having similar shapes indicate degraded performance of the conditioning catalyst. In contrast, signal shapes having significant differences indicate acceptable conversion efficiency for the conditioning catalyst. The transit time delay between the exhaust gas oxygen sensors is accounted for by sampling the upstream monitoring exhaust gas oxygen sensor signal for a first period of time while sampling the downstream control exhaust gas oxygen sensor signal for a second period of time with the first and second periods being substantially equal and the second time period beginning after the first time period. As described below, the second period may begin after a predetermined delay which may be fixed or variable based on engine operating parameters such as mass airflow, air/fuel ratio, and the like.

In one embodiment, upstream and downstream exhaust gas oxygen sensor signals are compared using a correlation coefficient according to:

$$R(k) = \frac{\sum \hat{x}(i)\,\hat{y}(i+k)}{\sqrt{\sum \hat{x}^2} \times \sqrt{\sum \hat{y}^2}}$$

where $\hat{x}$ and $\hat{y}$ are zero mean versions of the two signals x and y, k represents the time delay between the two signals, and R is the correlation coefficient. The engine controller can compute the correlation coefficient by sampling the upstream monitoring exhaust gas oxygen sensor and downstream control exhaust gas oxygen sensor for several seconds and storing the samples in memory. The average value is then calculated as the sum of the samples divided by the number of the samples. The zero mean version of the signals is then determined by subtracting the mean value from each sample. Each upstream signal sample is then multiplied by a corresponding downstream signal sample based on the time delay represented by k. The products are added together to form the numerator of the correlation coefficient expression indicated above. Each sample value is then squared and added together for the upstream and downstream signals, respectively. The square root of the sum of squares for the upstream sensor is then multiplied by the square root of the sum of squares for the downstream sensor. The ratio provides the correlation coefficient of the zero mean version of the signals which is used to compare the shape of the two signals while ignoring their amplitudes and mean values. For two signals having exactly the same shape, the correlation coefficient will be unity. Two signals that are substantially different will have a correlation coefficient approaching zero. The correlation coefficient may be compared to a threshold to determine the conversion efficiency of the conditioning catalyst. A mid-level correlation implies that the conditioning catalyst is operating normally. A correlation above the catalyst threshold indicates the monitoring sensor signal is very similar to the control sensor signal and the conditioning catalyst conversion efficiency is degraded. A diagnostic indicator, such as a check engine light, may be generated when the correlation coefficient exceeds the threshold. The threshold is preferably determined based on empirical data. The threshold may be a fixed value or may be modified to account for production and operating condition variations.

Figure 4:
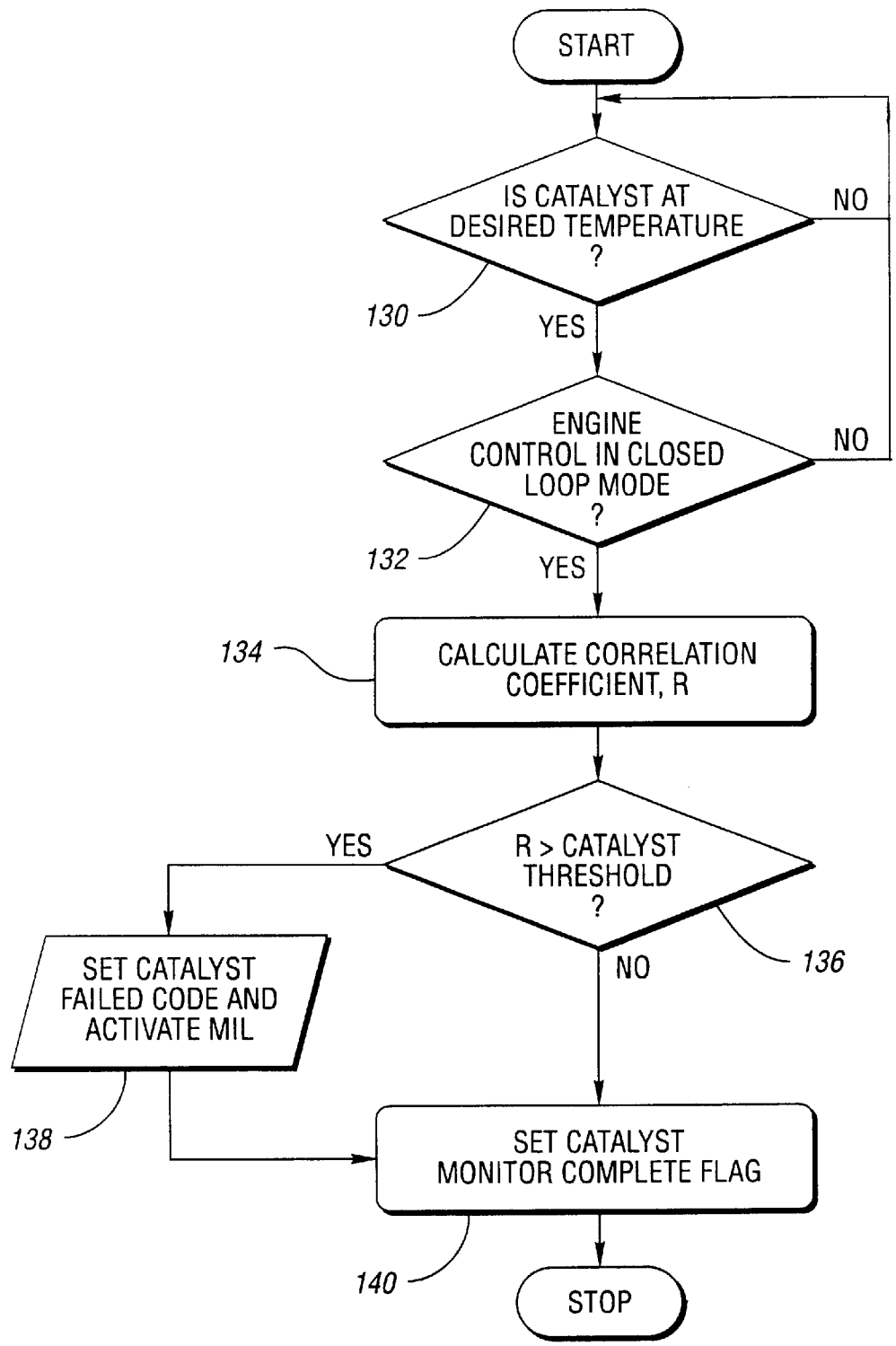
FIG. 4 is a block diagram illustrating operation of a system or method for monitoring a conditioning catalyst according to one embodiment of the present invention.
Figure 5:
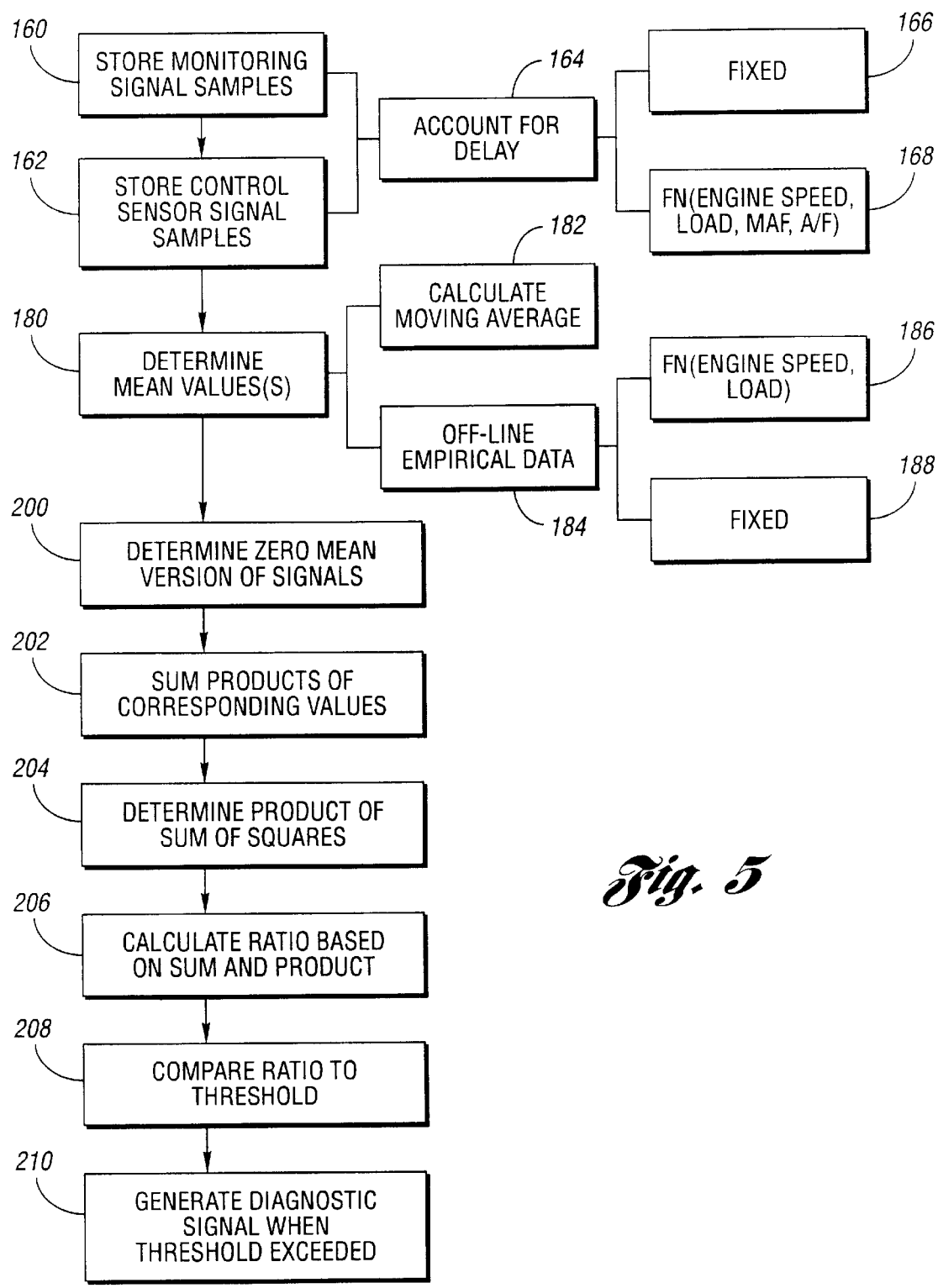
FIG. 5 is a more detailed block diagram illustrating determination of oxygen sensor signal correlation for use in monitoring a conditioning catalyst according to one embodiment of the present invention.

FIGS. 4 and 5 are block diagrams illustrating operation of a system or method for monitoring a conditioning catalyst according to one embodiment of the present invention. The diagrams of FIGS. 4 and 5 generally represent control logic for one embodiment of a system or method according to the present invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

FIG. 4 provides a block diagram illustrating operation of a system or method for monitoring a conditioning catalyst according to one embodiment of the present invention. Block 130 of FIG. 4 determines whether the conditioning catalyst is at a desired temperature for monitoring. The conditioning catalyst temperature may be directly measured by an associated sensor. Alternatively, the conditioning catalyst temperature may be inferred from various other engine operating parameters as described above. Once the conditioning catalyst has reached the desired temperature for monitoring as indicated by block 130, block 132 determines whether the engine is operating in the closed loop feedback control mode. If the conditioning catalyst has not reached its desired monitoring temperature or the engine is not operating in closed loop feedback control mode, the illustrated catalyst monitoring operations are not performed.

Once the entry conditions have been met as determined by blocks 130 and 132, a correlation coefficient based on collected samples is calculated as represented by block 134. As described above, sampled signals generated by the control exhaust gas oxygen sensor and the monitoring exhaust gas oxygen sensor may be adjusted to reduce the affect of any difference in signal amplitudes and mean values on the comparison. As represented by block 134 and described above with reference to FIGS. 3a and 3b, calculation of the correlation coefficient is preferably based upon zero mean versions of the sampled signals such that the shapes of the signals are compared to determine the relative similarity or difference between the signals.

The correlation coefficient is compared to a corresponding threshold as represented by block 136. When the correlation coefficient exceeds the corresponding threshold, a diagnostic indicator is generated as represented by block 138. Otherwise, the conditioning catalyst monitor has successfully completed and a corresponding flag is set as represented by block 140.

FIG. 5 provides a more detailed block diagram illustrating determination of oxygen sensor signal correlation for use in monitoring a conditioning catalyst according to one embodiment of the present invention. In contrast to the method described above with reference to FIGS. 3a and 3b, the method illustrated in FIG. 5 requires significantly less data storage. For example, the mathematical equation expressed above may require kilobytes of memory for storage of sample values for calculation of the mean value for each signal. Having a real-time estimate of the mean value reduces necessary data storage because each sample is processed as it is acquired. As such, the method illustrated in FIG. 5 requires only tens of bytes of data storage.

Signal samples from the upstream monitoring sensor and the downstream control sensor are collected as represented by blocks 160 and 162. Preferably, transit delay of exhaust gas flowing past the upstream and downstream sensors is accounted for as represented by block 164. The time delay between the two sensors may significantly affect the subsequent comparison of the signal shapes. The time delay may be determined using a fixed delay as represented by block 166 or as a function of various engine parameters as represented by block 168. For example, the time delay may be stored in a lookup table accessed based on air/fuel ratio, engine speed, load, and/or mass airflow, for example. Depending upon the particular application, a zero time delay may also provide acceptable results.

The estimated mean value for each signal is determined as represented by block 180. The signal mean values may be determined using low pass filters, by calculating a moving average as represented by block 182, or by using empirical data collected off-line as represented by block 184, for example. Empirical data may be used to populate a lookup table accessed as a function of engine operating or control parameters as represented by block 186. Alternatively, empirical data may be used to determine a fixed mean value estimate for each sensor signal as represented by block 188. This value may be adapted or adjusted to accommodate manufacturing and operating condition variation. Likewise, empirical data may suggest the use of similar or different mean values for each of the sensor signals depending upon the particular sensors and conditioning catalysts.

The zero mean version of the monitoring sensor signal and control sensor signal is determined as represented by block 200. The zero mean version may be determined by subtracting the estimated mean value determined by block 180 from each of the current sensor signal samples.

A running total or sum of the products of corresponding values is determined as represented by block 202. Preferably, the running sum is based on the zero mean values for the upstream monitoring sensor signal and the downstream control sensor signal. Corresponding values of the sensor signals account for the time delay, if any, as described above. A running sum of the squares of the signal values is determined as represented by block 204. The product of the square root of the sum of the squares for the upstream monitoring sensor and the square root of the sum of the squares of the downstream control sensor signal is also determined. These steps are repeated until a sufficient number of sample points have been acquired. As described above, depending upon how the time delay is accounted for, several samples of the upstream monitoring sensor may be collected before any samples of the downstream control sensor are collected. Conversely, the downstream control sensor may continue to be sampled after sampling of the upstream monitoring sensor has been completed.

A ratio of the quantities determined by blocks 202 and 204 is then computed as represented by block 206. The ratio may be compared to a corresponding threshold as represented by block 208. When the ratio exceeds the threshold, a diagnostic signal may be generated to alert the vehicle operator. For example, a malfunction indicator light may be illuminated.

As such, the present invention provides an efficient algorithm amenable for use in a conventional engine/vehicle controller to monitor a conditioning catalyst based on comparison of signal shapes. Accurate monitoring of the conditioning catalyst assures proper functioning which may allow the main catalyst system to be used more effectively to reduce tailpipe emissions. In addition, accurate monitoring of the conditioning catalyst may reduce premature warranty claims associated with inaccurate degradation indications while promptly notifying the vehicle operator of any actual degradation in conversion efficiency which may be necessary to comply with applicable regulations.

While the best mode for carrying out the invention has been described in detail, those familiar with the art to which this invention relates will recognize various alternative designs and embodiments for practicing the invention as defined by the following claims.

What is claimed:

1. A method for monitoring a conditioning catalyst positioned upstream of a control exhaust gas oxygen sensor used for feedback control of an internal combustion engine using a monitoring sensor positioned upstream of the conditioning catalyst, the method comprising:

sampling signals generated by the control exhaust gas oxygen sensor and the monitoring exhaust gas oxygen sensor, wherein the step of sampling signals comprises sampling the monitoring exhaust gas oxygen sensor signal for a first period of time; and sampling the control exhaust gas oxygen sensor signal for a second period of time, wherein the first and second periods are substantially equal and the second period begins after the first period, wherein the second period begins after a predetermined delay;

adjusting signal samples to reduce the effect of any difference in signal amplitudes and mean values on a subsequent comparison of the signals; and comparing shapes of the signals based on the adjusted signal samples to determine operational efficiency of the conditioning catalyst, wherein the predetermined delay is based on an air/fuel ratio for the internal combustion engine.

2. The method of claim 1 wherein the step of comparing shapes of the signals comprises:

calculating a correlation coefficient; and comparing the correlation coefficient to a corresponding threshold.

3. The method of claim 2 further comprising generating a diagnostic signal when the correlation coefficient exceeds the corresponding threshold.

4. A method for monitoring a conditioning catalyst positioned upstream of a control exhaust gas oxygen sensor used for feedback control of an internal combustion engine using a monitoring sensor positioned upstream of the conditioning catalyst, the method comprising:

sampling signals generated by the control exhaust gas oxygen sensor and the monitoring exhaust gas oxygen sensor, wherein the step of sampling signals comprises sampling the monitoring exhaust gas oxygen sensor signal for a first period of time; and sampling the control exhaust gas oxygen sensor signal for a second period of time, wherein the first and second periods are substantially equal and the second period begins after the first period, wherein the second period begins after a predetermined delay;

adjusting signal samples to reduce the effect of any difference in signal amplitudes and mean values on a subsequent comparison of the signals; and comparing shapes of the signals based on the adjusted signal samples to determine operational efficiency of the conditioning catalyst, wherein the predetermined delay is based on mass airflow.

5. The method of claim 4 wherein the step of adjusting signal samples comprises generating a zero mean version of the signals.

6. The method of claim 5 wherein generating a zero mean version comprises subtracting estimated mean values for each signal from corresponding sampled values for each signal.

7. The method of claim 6 wherein the estimated mean value is determined by filtering the sensor signals using a low pass filter.

8. The method of claim 6 wherein the estimated mean value is predetermined based on empirical data.

9. The method of claim 6 wherein the estimated mean value is calculated based on a predetermined number of previous signal samples.

10. A computer readable storage medium having stored data representing instructions executable by a computer to monitor a conditioning catalyst positioned upstream of a control exhaust gas oxygen sensor used for feedback control of an internal combustion engine using a monitoring sensor positioned upstream of the conditioning catalyst, the computer readable storage medium comprising:

instructions for sampling signals generated by the control exhaust gas oxygen sensor and the monitoring exhaust gas oxygen sensor, wherein the instructions for sampling signals comprise instructions for sampling the monitoring exhaust gas oxygen sensor signal for a first period of time; and instructions for sampling the control exhaust gas oxygen sensor signal for a second period of time, wherein the first and second periods are substantially equal and the second period begins after the first period, wherein the second period begins after a predetermined delay;

instructions for adjusting signal samples to reduce the effect of any difference in signal amplitudes and mean values on a subsequent comparison of the signals; and instructions for comparing shapes of the signals based on the adjusted signal samples to determine operational efficiency of the conditioning catalyst, wherein the predetermined delay is based on an air/fuel ratio for the internal combustion engine.

11. The computer readable storage medium of claim 10 wherein the instructions for adjusting signal samples include instructions for generating a zero mean version of the signals.

12. The computer readable storage medium of claim 11 wherein the instructions for generating a zero mean version comprise instructions for subtracting estimated mean values for each signal from corresponding sampled values for each signal.

13. The computer readable storage medium of claim 12 wherein the estimated mean value is determined by filtering the sensor signals using a low pass filter.

14. The computer readable storage medium of claim 12 wherein the estimated mean value is predetermined based on empirical data.

15. The computer readable storage medium of claim 12 wherein the estimated mean value is calculated based on a predetermined number of previous signal samples.

* * * * *